(12) United States Patent
Jones et al.

(10) Patent No.: US 8,229,008 B2
(45) Date of Patent: Jul. 24, 2012

(54) INTERFERENCE MITIGATION FOR ORTHOGONAL FREQUENCY DIVISION MULTIPLEXING COMMUNICATION

(75) Inventors: Alan Edward Jones, Caine (GB); Vishakan Ponnampalam, Clifton (GB)

(73) Assignee: Nvidia Corporation, Santa Clara, CA (US)

( * ) Notice: Subject to any disclaimer, the term of this patent is extended or adjusted under 35 U.S.C. 154(b) by 585 days.

(21) Appl. No.: 11/190,287

(22) Filed: Jul. 26, 2005

(65) Prior Publication Data

US 2007/0025454 A1     Feb. 1, 2007

(51) Int. Cl.
*H04K 1/10* (2006.01)

(52) U.S. Cl. .......... 375/260; 348/21; 375/346; 379/416; 455/456.6; 455/517

(58) Field of Classification Search ............... 370/208, 370/210, 334; 375/260, 358
See application file for complete search history.

(56) References Cited

U.S. PATENT DOCUMENTS

| | | | | |
|---|---|---|---|---|
| 7,324,437 B1 * | 1/2008 | Czylwik et al. | ............... | 370/210 |
| 2002/0105928 A1 * | 8/2002 | Kapoor et al. | ............... | 370/334 |
| 2003/0012318 A1 * | 1/2003 | Piirainen | ............... | 375/358 |
| 2006/0050625 A1 * | 3/2006 | Krasner | ............... | 370/208 |

FOREIGN PATENT DOCUMENTS

| | | |
|---|---|---|
| FR | 2854009 | 10/2004 |
| KR | 1020050048357 | 5/2005 |
| WO | WO0141387 | 6/2001 |
| WO | WO-0141387 | 6/2001 |
| WO | WO-0249385 | 6/2002 |

OTHER PUBLICATIONS

Jones, A.E. et al., (2005) "Generalised Multiuser Detection in TD-CDMA," *Proceedings of IEEE Vehicular Technology Conference*, Stockholm, Sweden, May 30-Jun. 1, 2005, pp. 1748-1752.
Munster et al. (Sep. 1999). "Co-Channel interference suppression assisted adaptive OFDM in interference limited environments," Vehicular Technology Conference, IEEE VTS 50th Amsterdam, Netherlands, vol. 1, pp. 284-288.
International Search Report mailed on Nov. 30, 2006, for PCT Application No. PCT/EP2006/064606, three pages.
Chinese Patent Application No. 200680026749.7; First Office Action issued on May 12, 2010.
Chinese Patent Application No. 200680026789.1; First Office Action issued on May 12, 2010.
European Application No. 06 763 958.3-1525; Communication Pursuant to Article 94(3)EPC Dated Sep. 3, 2009.
European Application No. 06 777 941.3-1525; Communication Pursuant to Article 94(3)EPC Dated Sep. 3, 2009.
Korean Patent Application No.10-2007-7030304; Preliminary Office Action Dated Dec. 16, 2008.

* cited by examiner

*Primary Examiner* — David C. Payne
*Assistant Examiner* — Adolf Dsouza

(57) ABSTRACT

An Orthogonal Frequency Division Multiplex (OFDM) communication system comprises OFDM transmitters, an OFDM receiver, and a subcarrier status data controller for transmitting subcarrier status data to the OFDM receiver. The subcarrier status data indicates the active subcarriers of the OFDM transmitters. The OFDM receiver comprises a receiver, a subcarrier status processor, a channel estimator, and an interference mitigation processor.

49 Claims, 6 Drawing Sheets

INTERFERENCE MITIGATION FOR ORTHOGONAL FREQUENCY DIVISION MULTIPLEXING COMMUNICATION

FIELD OF THE INVENTION

The invention relates to interference mitigation for orthogonal frequency division multiplexing communication, and in particular, but not exclusively, to interference mitigation in a cellular communication system employing orthogonal frequency division multiple access.

BACKGROUND OF THE INVENTION

Wireless communication using radio frequencies has become increasingly widespread in the last decade and many communication systems now compete for a limited resource. As a result, one of the most important parameters for wireless communication systems is how efficiently they can use the allocated frequency spectrum.

The requirement for an efficient use of the scarce frequency spectrum resource has led to the development of wireless technologies that can operate with high levels of interference. For example, it is a key requirement for high capacity cellular communication systems that a high level of interference can be permitted. Typically these communication systems operate with a frequency reuse of one, which means that the same channel bandwidth is available and is used in all sectors and cells across the network. As a result, the intercell interference seen from the neighbor cells can be very substantial at the cell overlap areas. Since the power available to the transmitter is constrained, the available Carrier to Interference Ratio (C/I) and hence the data rate is also constrained under this condition. If the intercell interference can be removed, the effective C/I increases and the data rate increases commensurate with the improvement in C/I. This may provide a much higher spectral efficiency and increase the capacity of the system substantially, and it is therefore highly desirable to remove or mitigate the intercell interference.

A communication scheme which may be used in wireless communication systems is the Orthogonal Frequency Division Multiple (OFDM) scheme. Furthermore, a cellular communication system may use Orthogonal Frequency Division Multiple Access (OFDMA) wherein users in the same cell are assigned sub-carrier groups that are simultaneously active with other user's sub-carrier groups. However, in OFDMA, transmissions within a cell may be kept orthogonal and the interference generated to users in the same cell (intracell interference) can be effectively mitigated to the extent that it can typically be ignored.

However, interference from other cells (intercell interference) is not orthogonal and may consequently appear as interference and degrade the transmissions. As a consequence, it is highly desirable to mitigate the impact of the intercell interference. Techniques for mitigating intercell interference are well known in the art and an example of a method of intercell interference mitigation can be found in A. E. Jones and S. H. Wong; "Generalised Multiuser Detection in TD-CDMA", Proceedings of IEEE Vehicular Technology Conference, Stockholm, May 2005, the Institute of Electrical and Electronic Engineers, incorporated by reference herein.

However, a problem with the known approaches for mitigation of interference is that the performance and efficiency is highly dependent on information relating to the interferers. This information is typically difficult to obtain for the individual receiver resulting in the relatively inaccurate estimates or assumptions being used. As a consequence, the interference mitigation is frequently suboptimal and results in a significant degradation of the communication quality and a reduction of the capacity of the cellular communication system.

Hence, improved interference mitigation for OFDM communication would be advantageous and in particular a system allowing increased flexibility, improved performance, increased system capacity, facilitated operation, reduced complexity and/or improved provision of information enabling, facilitating or improving interference mitigation would be advantageous.

SUMMARY OF THE INVENTION

Accordingly, the invention seeks to preferably mitigate, alleviate or eliminate one or more of the above mentioned disadvantages singly or in any combination.

According to a first aspect of the invention there is provided an Orthogonal Frequency Division Multiplex (OFDM) communication system comprising: a plurality of OFDM transmitters; at least one OFDM receiver for receiving an OFDM signal from a first OFDM transmitter of the plurality of OFDM transmitters; and transmission means for transmitting subcarrier status data to the OFDM receiver, the subcarrier status data being indicative of active subcarriers for a number of OFDM transmitters other than the first OFDM transmitter; wherein the OFDM receiver comprises: means for receiving a signal comprising a desired signal component from the first OFDM transmitter and interference from at least one interfering OFDM transmitter of the plurality of OFDM transmitters, means for receiving the subcarrier status data, channel estimation means for determining channel estimates for at least an air interface communication channel from the first OFDM transmitter and an air interface communication channel from the interfering OFDM transmitter, interference mitigation means for performing mitigation of the interference in response to the subcarrier status data and the channel estimates.

The inventors of the current invention have realized that improved performance can be achieved in an OFDM communication system by signalling information indicative of which subcarriers are active for an interfering OFDM transmitter. The invention may facilitate the provision of information used for interference mitigation and/or may provide improved accuracy of this information. An improved interference mitigation may be achieved which may result in increased communication quality and/or increased system capacity. A low complexity system and/or a practical implementation may be achieved.

The transmission means may be distributed in the communication system and may specifically be part of the OFDM transmitters. For example, each of the OFDM transmitters may comprise functionality for transmitting subcarrier status data. The interference mitigating means may be arranged to regenerate the data transmitted by the first OFDM transmitter in response to the channel estimates, the received signal and the subcarrier status data. The subcarrier status data may be processed before being used for interference mitigation. For example, the subcarrier status data may be decoded, divided, combined or processed in any suitable way.

An active subcarrier may be a carrier on which data is transmitted whereas a non-active subcarrier may be a carrier on which no data is transmitted. The subcarrier status data may correspond to information for all subcarriers of an OFDM symbol or may correspond to information for all subcarriers or for only a subset of subcarriers.

According to an optional feature of the invention, the interfering OFDM transmitter is arranged to transmit subcarrier status data indicative of active subcarriers of the interfering OFDM transmitter.

This may allow an efficient system and may allow a practical implementation. For example, each OFDM transmitter may transmit subcarrier status data indicating which subcarriers it is actively using. Subcarrier status data for the entire OFDM symbol may be determined by combining subcarrier status data from a plurality of the OFDM transmitters.

According to an optional feature of the invention, at least one other OFDM transmitter of the plurality of OFDM transmitters is arranged to transmit subcarrier status data indicative of active subcarriers of the interfering OFDM transmitter.

This may allow an efficient system and/or may allow a practical implementation. Specifically it may allow subcarrier status data for e.g., a plurality of OFDM transmitters to be obtained by receiving a communication from only a single OFDM transmitter. For example, the OFDM transmitters may be coupled through a fixed network and at least some of the OFDM transmitters may comprise functionality for transmitting subcarrier status data relating to other OFDM transmitters.

According to an optional feature of the invention, all OFDM transmitters of a group of OFDM transmitters transmit subcarrier status data for all the OFDM transmitters of the group.

This may allow a facilitated operation of the system and/or may facilitate the reception of the subcarrier status data by the OFDM receiver. In particular, the OFDM receiver may receive the subcarrier status data from any OFDM transmitter and is not restricted to obtain specific subcarrier status data from a specific OFDM transmitter.

According to an optional feature of the invention, the group of OFDM transmitters corresponds to base stations controlled by a single Radio Network Controller of a cellular communication system.

This may improve performance and provide low complexity, facilitated operation and/or simplified reception of the subcarrier status data in a cellular communication system.

According to an optional feature of the invention, the group of OFDM transmitters are arranged to transmit at least some of the subcarrier status data by a substantially synchronous transmission of the same OFDM symbol.

This may improve performance and/or facilitate operation. In particular, it may allow the OFDM receiver to receive the subcarrier status data without requiring that it separates between signals from different OFDM transmitters. For example, it may provide air interface combining of signals from different OFDM transmitters.

According to an optional feature of the invention, the means for transmitting is arranged to repeatedly transmit subcarrier status data, each transmission of subcarrier status data relating to a time interval in which the subcarrier status data is valid.

This may allow a flexible and efficient system where communication and management overhead may be kept low.

According to an optional feature of the invention, at least the interfering OFDM transmitter is arranged to transmit a known data sequence.

This may improve performance and/or facilitate operation or implementation.

The known data sequence may e.g., be a pilot signal, a sequence of known pilot symbols and/or known training data. The known data sequence may be a sequence in the time domain and/or the frequency domain. For example, the known data sequence may comprise subcarrier symbols in a plurality of subcarriers in the same OFDM symbol as well as in consecutive OFDM symbols.

According to an optional feature of the invention, the channel estimation means is arranged to determine the channel estimate for the interfering OFDM transmitter in response to the known data sequence.

This may allow a particularly suitable and efficient means of determining a channel estimate for the interfering OFDM transmitter.

According to an optional feature of the invention, the transmission means comprises means in the interfering OFDM transmitter for selecting the known data sequence in response to the active subcarriers for the interfering OFDM transmitter.

This may allow a particularly efficient communication of information of the subcarrier status data. Specifically, the subcarrier status data may be represented by the known data sequence selected and the requirement for communicating explicit data for the subcarrier status data may be obviated.

According to an optional feature of the invention, the OFDM receiver is arranged to determine the subcarrier status data in response to a detection of a known data sequence of an OFDM transmission.

This may allow a particularly efficient communication of information of the subcarrier status data. Specifically, the subcarrier status data may be represented by the known data sequence and the requirement for receiving and decoding explicit data for the subcarrier status data may be obviated. The known data sequence may be the known data sequence from the interfering OFDM transmitter and/or may be a known data sequence from a different OFDM transmitter. The subcarrier status data may e.g., be determined by combining subcarrier status data for different subcarriers received from different OFDM transmitters by the known data sequence used by the individual OFDM transmitter.

According to an optional feature of the invention, disjoint sets of known data sequences are allocated to different OFDM transmitters.

This may facilitate determination of the origin of a received signal.

According to an optional feature of the invention, the subcarrier status data comprises at least one data value indicative of an active subcarrier status for a group of subcarriers.

This may facilitate communication of the subcarrier status data and may reduce the overhead required for the communication thereof. For example, the subcarriers may be divided into groups of larger size and a single active/ non-active indication may be given for the entire group. This may be particularly suitable for applications where subcarriers are allocated users in subcarrier groups.

According to an optional feature of the invention, the OFDM communication system further comprises means for transmitting an indication of a plurality of potentially interfering OFDM transmitters to the OFDM receiver.

This may facilitate operation and/or improve performance. For example, in a cellular communication system, a neighbor list may be transmitted indicating the neighbor OFDM transmitters serving adjacent cells.

According to an optional feature of the invention, the OFDM receiver further comprises means for evaluating received signals from a plurality of potentially interfering transmitters, and means for selecting a subset of the plurality of potentially interfering transmitters for interference mitigation in response to the evaluation.

This may reduce complexity, processing overhead and/or may allow improved performance. Specifically, the feature may allow that interference mitigation is focused on the main interfering sources in the specific situation and may thus allow the available interference mitigation resource to be used most efficiently. Any suitable evaluation and selection criterion may be used. For example, the evaluation may determine one or more of an interference level, a receive level signal, a subcarrier interference level etc and the selection may for example correspond to a selection of the N sources causing the highest interference levels, where N is the number of interfering sources that can be mitigated by the interference mitigation means. The evaluation may for example be based on transmissions of known data sequences from the OFDM transmitters and specifically may be based on pilot signals from the OFDM transmitters.

According to an optional feature of the invention, the OFDM communication system further comprises means for selecting a subset of the subcarrier status data relating to the subset of the plurality of potentially interfering transmitters.

This may facilitate operation and/or reduce the computational load. For example, the OFDM receiver may only demodulate and decode the subcarrier status data corresponding to the OFDM transmitters selected for the interference mitigation.

According to an optional feature of the invention, the OFDM receiver further comprises means for determining an identity of an OFDM transmitter active on a given subcarrier in response to the subcarrier status data.

This may allow improved performance and may in particular improve interference mitigation as the appropriate source for a given subcarrier interference can be identified. For example, the subcarrier status data may indicate that a first group of subcarriers are active for one OFDM transmitter whereas a second group of subcarriers are active for another OFDM transmitter. If e.g., the first OFDM transmitter is active on both the first and second group of subcarriers, the interference mitigation may take the first interfering OFDM transmitter into account for the first group of subcarriers and the second interfering OFDM transmitter into account for the second group of subcarriers.

According to an optional feature of the invention, the OFDM receiver comprises means for determining channel estimates for individual subcarriers in response to the subcarrier status data.

The channel estimates may particularly be determined based on a determination of a source of the interfering signal in a given subcarrier in response to an identity of the OFDM transmitter(s) being active in this subcarrier comprised in the subcarrier status data.

This may facilitate operation and allow improved determination of the interference scenario and thus improved interference mitigation.

According to an optional feature of the invention, the means for receiving is arranged to receive a subset of the subcarrier status data from a plurality of OFDM transmitters; and the OFDM receiver comprises means for determining subcarrier status data by combining the subsets of subcarrier status data.

This may facilitate operation and/or improve performance in many applications. For example, in an uplink scenario for a cellular communication system, the OFDM transmitters of remote units may transmit subcarrier status data indicating which subcarriers they are allocated and which are thus active. By combining the subcarrier status data from the remote units, subcarrier status data for the entire OFDM symbol may be derived.

According to an optional feature of the invention, the mitigation means is arranged to perform a joint determination of data symbols from at least the first OFDM transmitter and the interfering OFDM transmitter.

This allows high performance and/or a practical implementation. The joint determination may be a joint detection.

According to an optional feature of the invention, the communication system is a cellular communication system.

The invention may provide improved performance in a cellular communication system using OFDM communication techniques, and may in particular mitigate intercell interference thereby improving communication quality and/or service.

According to an optional feature of the invention, the plurality of OFDM transmitters corresponds to a plurality of base stations.

The invention may provide improved performance in the downlink of a cellular communication system and may in particular reduce the impact of intercell interference.

According to an optional feature of the invention, the plurality of OFDM transmitters corresponds to a plurality of remote units wherein the first OFDM transmitter and the interfering OFDM transmitter have different serving cells.

The invention may provide improved performance in the uplink of a cellular communication system and may in particular reduce the impact of intercell interference.

According to an optional feature of the invention, the OFDM receiver comprises means for determining subcarrier status data for a neighbor cell of a serving cell of the OFDM receiver.

This may facilitate and/or improve intercell interference mitigation and may thus improve performance of the communication system as a whole.

According to an optional feature of the invention, the interference mitigation means is arranged to determine a subcarrier activity status for a neighbor cell of a serving cell of the OFDM receiver from subsets of subcarrier status data received from a plurality of OFDM transmitters of the neighbor cell.

This may facilitate and/or improve interference mitigation in a cellular communication system. In particular, it may facilitate the determination of the active status of subcarriers. The feature is particularly suitable for uplink communication.

For example, in an uplink scenario for a cellular communication system, the OFDM transmitters of remote units may transmit subcarrier status data indicating which subcarriers they are allocated and which are thus active. By combining the subcarrier status data from the remote units, subcarrier status data for the entire OFDM symbol may be derived.

According to another aspect of the invention, there is provided an OFDM receiver for receiving an OFDM signal from a first OFDM transmitter of a plurality of OFDM transmitters, the OFDM receiver comprising: means for receiving a signal comprising a desired signal component from the first OFDM transmitter and interference from at least one interfering OFDM transmitter of the plurality of OFDM transmitters; means for receiving subcarrier status data, the subcarrier status data being indicative of active subcarriers for a number of OFDM transmitters other than the first OFDM transmitter; channel estimation means for determining channel estimates for at least an air interface communication channel from the first OFDM transmitter and an air interface communication channel from the interfering OFDM transmitter; interference mitigation means for performing mitigation of the interference in response to the subcarrier status data and the channel estimates.

According to another aspect of the invention, there is provided an OFDM transmitter comprising means for transmitting subcarrier status data to a OFDM receiver, the subcarrier status data being indicative of active subcarriers for a number of OFDM transmitters not communicating with the OFDM receiver.

According to another aspect of the invention, there is provided a method of interference mitigation in a Orthogonal Frequency Division Multiplex (OFDM) communication system comprising a plurality of OFDM transmitters, and at least one OFDM receiver for receiving an OFDM signal from a first OFDM transmitter of the plurality of OFDM transmitters; the method comprising: transmitting subcarrier status data to the OFDM receiver, the subcarrier status data being indicative of active subcarriers for a number of OFDM transmitters other than the first OFDM transmitter; and at the OFDM receiver: receiving a signal comprising a desired signal component from the first OFDM transmitter and interference from at least one interfering OFDM transmitter of the plurality of OFDM transmitters, receiving the subcarrier status data, determining channel estimates for at least an air interface communication channel from the first OFDM transmitter and an air interface communication channel from the interfering OFDM transmitter, performing mitigation of the interference in response to the subcarrier status data and the channel estimates.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a cellular communication system using OFDM techniques. However, it will be appreciated that the invention is not limited to this application but may be applied to many other OFDM communication systems including, for example, OFDM based Wireless Local Area Networks such as IEEE 802.11.

Figure 1:
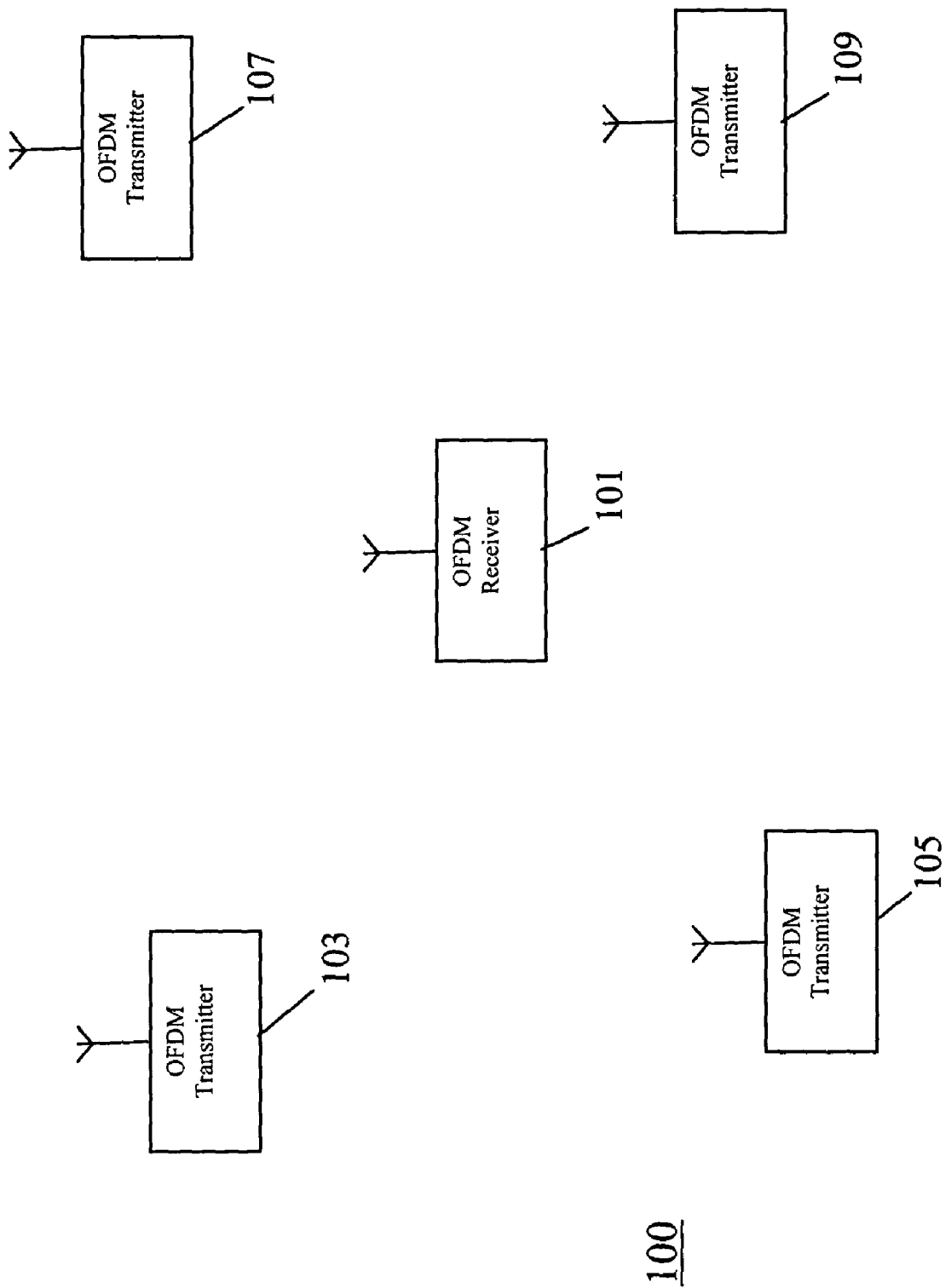
FIG. 1 illustrates and example of a communication system in accordance with some embodiments of the invention.

FIG. 1 illustrates an example of a communication system in accordance with some embodiments of the invention. FIG. 1 specifically illustrates one OFDM receiver 101 and four OFDM transmitters 103, 105, 107, 109. It will be appreciated that the communication system may comprise many more OFDM receivers and transmitters and that OFDM transmitters and receivers may be combined as OFDM transceivers. Thus, typically, most communication units comprise both an OFDM receiver and an OFDM transmitter.

In the example, the OFDM receiver 101 is receiving a desired signal from a first OFDM transmitter 103 whereas the other OFDM transmitters 105-109 transmit to other OFDM receivers but in the same frequency band (for example they may be in different cells of a cellular communication system having a frequency reuse of one). Thus, the other OFDM transmitters 105-109 create interference to the OFDM receiver 101. In accordance with some embodiments of the invention, this interference is mitigated thereby providing improved reception of the wanted signal from the first OFDM transmitter 103

An OFDM signal for the data word $\alpha=(\alpha_1, \ldots, \alpha_N)$ can be represented by:

$$s_k = \sum_{n=1}^{N} \lambda_n \alpha_n e^{-j\frac{2\pi(n-1)k}{T_c}} \quad (1)$$

where $T_c$ is the OFDM symbol period and $\lambda_n \epsilon (0,1)$ defines whether the sub-carrier is active or inactive. The elements of the vector $\alpha$ are generally complex modulation symbols that can be modulated in both phase and amplitude.

A subcarrier may be considered active when $|\alpha_n|>0$ or more specifically with reference to eq. 1 when $\lambda_n=1$. Similarly, a subcarrier may be considered inactive when $|\alpha_n|=0$ or when $\lambda_n=0$.

Typically, the OFDM symbol is pre-pended with a cyclic prefix of length P. The use of cyclic prefix reduces inter-symbol interference and maintains orthogonality in dispersive channels. The technique of cyclic prefixing OFDM symbols is well known in the art and will for brevity not be described further. It will furthermore be appreciated that the pre-pending of a cyclic prefix is not important for the inventive concepts and that the following description applies equally well to OFDM communication not using a cyclic prefix.

The OFDM symbol with cyclic prefix is represented by the vector $c=(c_1, c_2, \ldots, c_{N+P})$.

After transmission through the channel, and processing by the receiver, the sampled input to the OFDM demodulator is given by $$r=b+z \quad (2)$$

where $b=c \otimes h$, $\otimes$ denotes convolution, $h=(h_1, h_2, \ldots, h_W)$ is the channel impulse response of the air interface communication channel between the first OFDM transmitter 103 and the OFDM receiver 101, and $z=(z_1, z_2, \ldots, z_{N+P+W-1})$ contains both thermal noise and intercell interference from the other OFDM transmitters 103-109.

Demodulation is achieved by using the reciprocal process to that employed in the transmitter via the Fast Fourier Transform (FFT). Prior to demodulation the cyclic prefix is removed (and thus the tail from the channel dispersion is removed). The resulting signal can be represented by:

$$r'=b'+z' \quad (3)$$

The complex time samples from an OFDM symbol are transformed by a Fast Fourier Transform (FFT) to produce a set of complex modulation states, one for each sub-carrier. The output of the FFT is given by $$u=\lambda \times \alpha \times H + F(z) \quad (4)$$

where $F(.)$ corresponds to the FFT process and $H$ is the frequency domain representation of the channel impulse response, i.e., $H=F(h)$. The intercell interference plus thermal noise term $F(z)$ can be expanded, such that:

$$F(z) = \sum_{x=1}^{X} \gamma_x H_x + F(n) \quad (5)$$

where for OFDM transmitter x, $\gamma_x = \lambda_x \times \alpha_x$ and $H_x$ are the data word and frequency domain representation of the channel impulse respectively, and X is the number of interfering OFDM transmitters to be considered. The vector $n=(n_1, n_2, \ldots, n_N)$ contains thermal noise and any error terms that may arise from imperfect receiver processing.

For a cellular communication system, the serving cell is denoted by the subscript 0. By substituting eqn. 4 into eqn. 3 the output of the FFT is given by $$u(H_0, H_1, H_2, \ldots, H_X) \times \begin{pmatrix} \lambda_0 \\ \lambda_1 \\ \lambda_2 \\ \vdots \\ \lambda_X \end{pmatrix} \times \begin{pmatrix} \alpha_0 \\ \alpha_1 \\ \alpha_2 \\ \vdots \\ \alpha_X \end{pmatrix} + F(n) \quad (6)$$

This output vector is in a form which is well known to be amenable for mitigating intercell interference. A number of techniques will be known to the person skilled in the art for mitigating interference based on this representation and specifically techniques for determining $\alpha_0$ by jointly detecting the data vectors $\alpha_x$.

An example of a suitable interference mitigation algorithm may for example be found in A. E. Jones and S. H. Wong; "Generalised Multiuser Detection in TD-CDMA", Proceedings of IEEE Vehicular Technology Conference, Stockholm, May 2005, the Institute of Electrical and Electronic Engineers, incorporated by reference herein. This algorithm comprises a data estimation technique based on the above representation of the FFT output.

However, the accuracy of the data estimation technique and the efficiency of the interference mitigation algorithm heavily depend on the accuracy of the information used for the interference mitigation. In particular, the inventors have realized that improved performance can be achieved if improved information of the vectors $\lambda_x$ and $H_x$ can be determined, i.e., if improved information of the activity status of the individual subcarriers and/or the channel estimates can be provided.

In the example of FIG. 1, the OFDM communication system comprises means for transmitting subcarrier status data to the OFDM receiver 101. The subcarrier status data is indicative of the active subcarriers for one or more of the OFDM transmitters 105-109. Thus, the subcarrier status data may directly provide the activity status of one or more subcarriers of one or more of the OFDM transmitters 105-109 or may indirectly provide an indication allowing at least one activity status of at least one subcarrier of at least one interfering OFDM transmitter to be determined.

For example, each of the OFDM transmitters 105-109 may comprise means for transmitting a message to the OFDM receiver 101 indicating which subcarriers are currently active for the specific OFDM transmitter 105-109. The OFDM receiver 101 may then combine these messages to generate subcarrier status data for all of the OFDM transmitters 105-109. In this way, the subcarrier status data may be used to generate accurate information for the vectors $\lambda_x$ thus allowing improved interference mitigation.

Furthermore, the subcarrier status data may assist in the determination of the channel estimates. For example, the subcarrier status data received from the different OFDM transmitters 105-109 provides information of which OFDM transmitter is active in which specific subcarriers. Thus, the OFDM receiver 101 can generate the channel response for the interferer in a given subcarrier based on which OFDM transmitter is currently active in that subcarrier.

Thus, by signalling the activity of the subcarriers to the OFDM receiver 101 a much improved interference mitigation can be achieved resulting in improved communication, improved carrier to effective interference ratio and an increased capacity of the cellular communication system.

In the following a more detailed description for a cellular communication system will be given. For clarity and brevity, the description will focus on an OFDM receiver 101 receiving a signal from one OFDM transmitter 101 with one main interferer being present. However, it will be appreciated that the OFDM receiver 101 may simultaneously receive signals from a plurality of OFDM transmitters in different subcarriers and that the described concepts are readily applied to a plurality of interferers.

Figure 2:
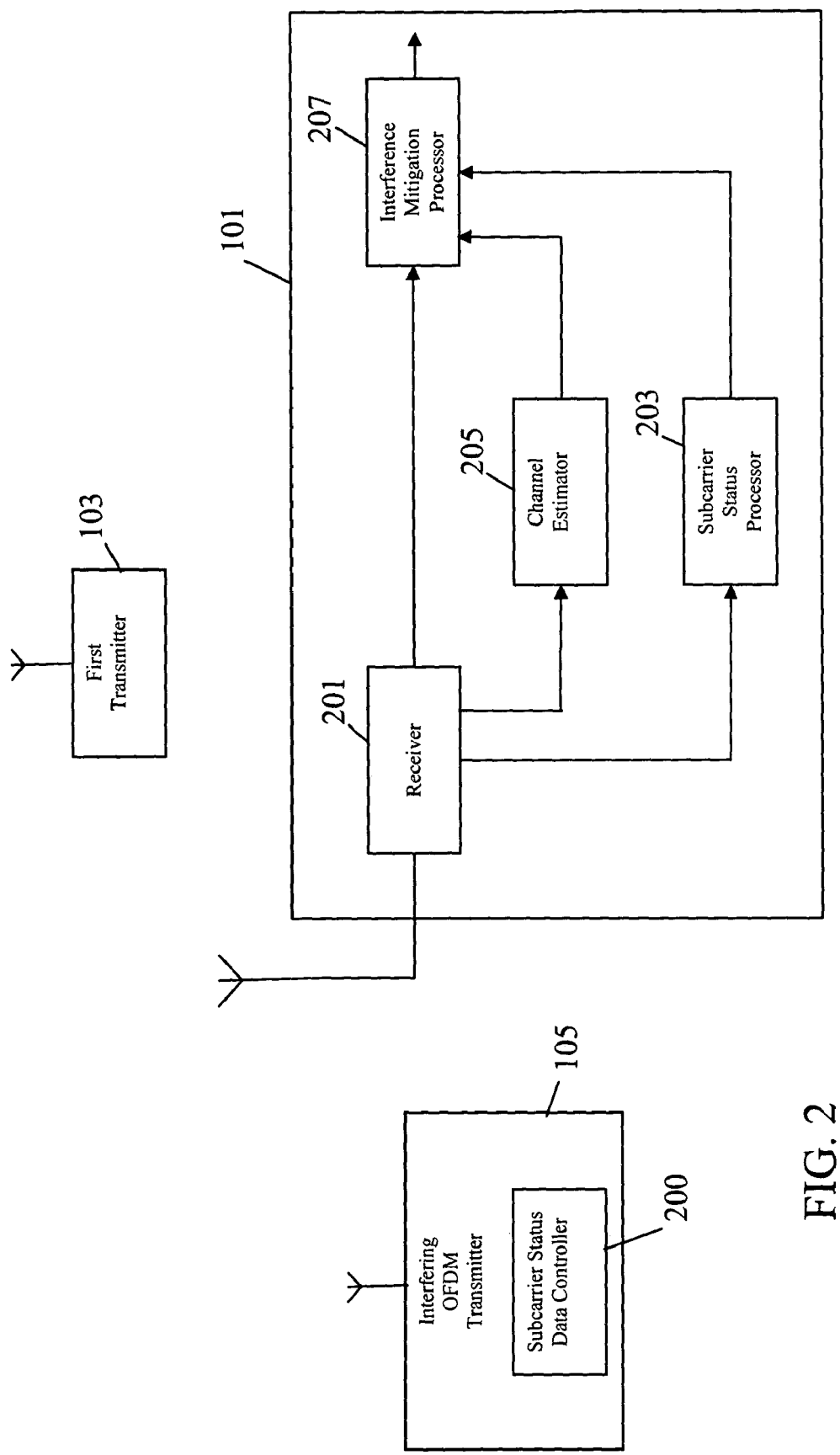
FIG. 2 illustrates an OFDM receiver in accordance with some embodiments of the invention.

FIG. 2 illustrates an OFDM receiver in accordance with some embodiments of the invention. The OFDM receiver 101 may specifically be the OFDM receiver 101 of FIG. 1 and will be described with reference to the example of FIG. 1.

The invention will initially be described with reference to a downlink scenario wherein the OFDM receiver 101 corresponds to a remote unit of a cellular communication system and the OFDM transmitters 103-109 correspond to base stations of the cellular communication systems. Thus, the OFDM transmitters 103-109 are in this example neighboring base stations forming neighbor cells for the OFDM receiver 101.

The remote unit may be a user equipment such as a $3^{rd}$ Generation User Equipment (UE), a communication unit, a subscriber unit, a mobile station, a communication terminal, a personal digital assistant, a laptop computer, an embedded communication processor or any physical, functional or logical communication element which is capable of communicating over the air interface of the cellular communication system.

In the example, the OFDM receiver 101 is in the cell served by the first OFDM transmitter 103 and is communicating with this using a set of subcarrier assigned to it.

In addition, a neighbor cell base station comprises an interfering OFDM transmitter 105 which creates intercell interference to the OFDM receiver 101. The intercell interference may be particularly high if the OFDM receiver 101 is located close to the cell edge between the cells of the first OFDM transmitter 103 and the interfering OFDM transmitter 105.

In the example, the interfering OFDM transmitter 105 comprises a subcarrier status data controller 200 which is arranged to determine subcarrier information for the base station comprising the interfering OFDM transmitter 105.

Specifically, the subcarrier status data controller 200 obtains information of which subcarriers are currently allocated to remote units for ongoing communications and which subcarriers are currently not in use. In response, the subcarrier status data controller 200 generates subcarrier status data which indicates this status. For example, the subcarrier status data controller 200 can generate a data word comprising a binary value for each subcarrier indicating whether this is currently active or not active.

In the specific example, the interfering OFDM transmitter 105 transmits the subcarrier status data to the OFDM receiver 101. For example, the interfering OFDM transmitter 105 may transmit the subcarrier status data by including the subcarrier status data binary data word in a pre-allocated slot of a broadcast channel transmitted with the maximum transmit power of the base station.

The OFDM receiver 101 comprises a receiver 201 which is operable to receive radio signals in the desired frequency band. Thus, the receiver will receive a signal comprising signal components from both the desired source of the first OFDM transmitter 103 as well as an interfering signal component from the interfering OFDM transmitter 105. In addition, the received signal may comprise interference from other sources as well as noise.

The receiver 201 comprises well known functionality such as filtering, amplification and time-to-frequency transforms for generating subcarrier data symbols for the OFDM subcarriers. Thus, the receiver can specifically comprise an FFT for generating an OFDM symbol.

The receiver 201 is furthermore operable to receive the subcarrier status data transmitted from the interfering OFDM transmitter 105. For example, in a time division system, the receiver 201 may retune to the broadcast channel of the interfering OFDM transmitter 105 during some time slots or frames and may decode the subcarrier status data thereon.

It will be appreciated that any suitable way of receiving the subcarrier status data may be used and that the OFDM receiver 101 may for example comprise separate receivers for receiving the OFDM data symbols and the subcarrier status data or the subcarrier status data may be transmitted in a way that allows the subcarrier status data to be determined as part of the reception of the wanted data.

In the example of FIG. 2, the receiver 201 is furthermore coupled to a subcarrier status processor 203 and a channel estimator 205.

The subcarrier status processor 203 receives the subcarrier status data from the receiver 201 and may further process this data to provide a suitable format for interference mitigation. In particular, the subcarrier status processor 203 may generate the vectors $\lambda_x$, for example by combining individual subcarrier status data received from the different OFDM transmitters 105-109.

The channel estimator 205 determines channel estimates for at least an air interface communication channel from the first OFDM transmitter 103 to the OFDM receiver 101 and for an air interface communication channel from the interfering OFDM transmitter 105 to the OFDM receiver 101. The channel estimator 205 may further generate channel estimates for communication channels from other interfering OFDM transmitters 107, 109 which are to be considered in the interference mitigation. Thus, the channel estimator 205 generates the channel estimate vectors $H_x$.

It will be appreciated that any method of determining the channel estimates may be used without detracting from the invention. For example, the channel estimates may be determined in response to training data transmitted from the OFDM transmitters 103-109.

The receiver 201, the subcarrier status processor 203 and the channel estimator 205 are coupled to an interference mitigation processor 207 which performs interference mitigation of the received subcarrier symbols in response to the subcarrier status data and the channel estimates. Thus, the interference mitigation processor 207 is fed the received data as well as the subcarrier activity vectors $\lambda_x$ and the channel estimate vectors $H_x$.

For example, the interference mitigation processor 207 may perform an estimation of the received data $\alpha_0$ by jointly estimating the data vectors $\alpha_x$ as described in A. E. Jones and S. H. Wong; "Generalised Multiuser Detection in TD-CDMA", Proceedings of IEEE Vehicular Technology Conference, Stockholm, May 2005, the Institute of Electrical and Electronic Engineers, incorporated by reference herein. In the above referenced article, the proposed interference mitigation technique is applied to a TD-CDMA air interface, but the person skilled in the art can readily extend this to OFDM systems.

More specifically, a method using linear processing can be appropriate, where an inverse representation of the interfering signal passed through the relevant channel is constructed and the received set of data samples is processed by the inverse representation of the above thereby producing an estimate of the data symbols with the interference suppressed.

Figure 3:
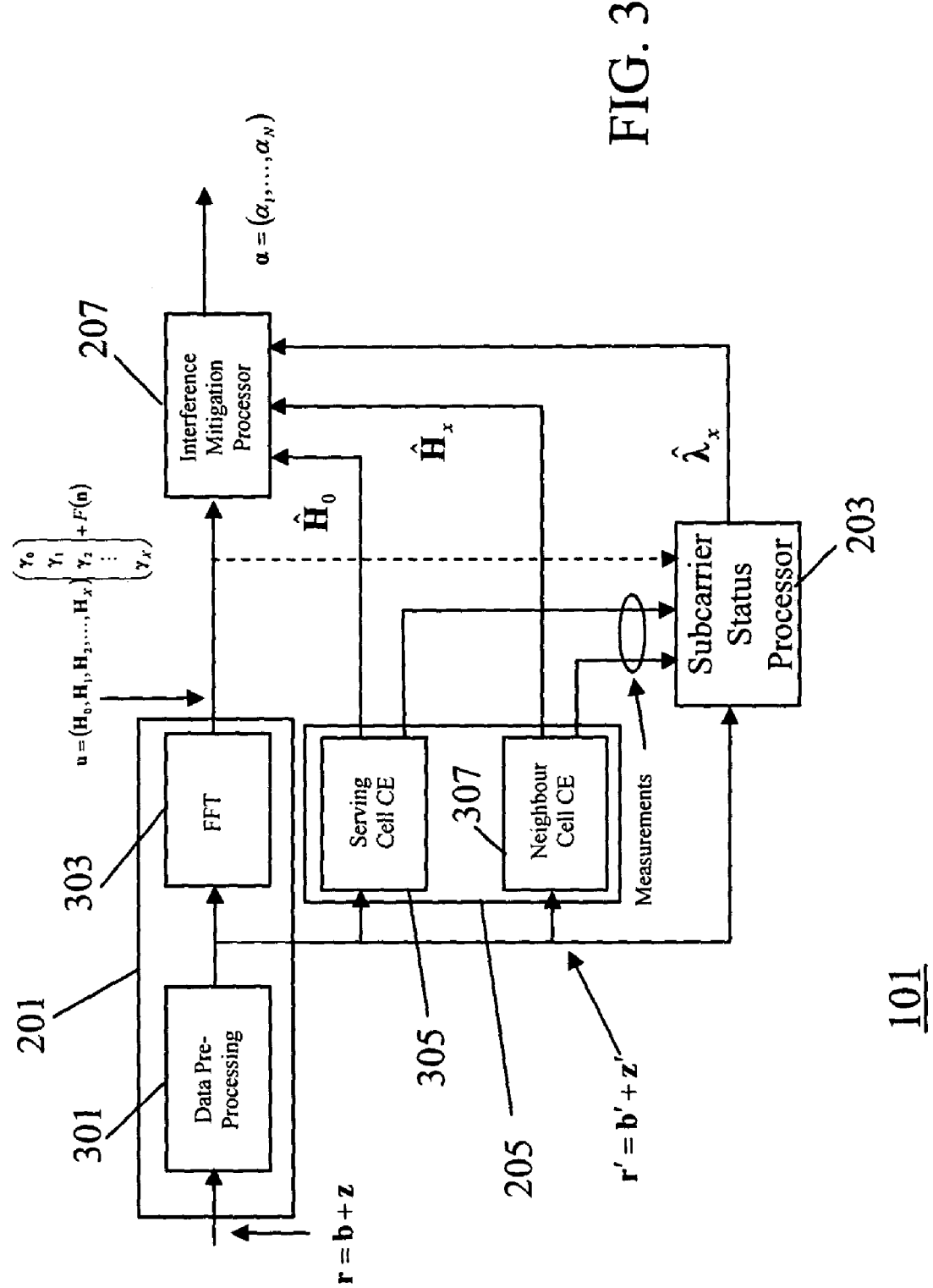
FIG. 3 illustrates an OFDM receiver in accordance with some embodiments of the invention.

FIG. 3 illustrates the OFDM receiver 101 in more detail. In the example, the receiver 201 comprises means for data pre-processing 301 which removes the cyclic prefix for the received OFDM symbols. After cyclic prefix removal, the received signal is fed to the FFT 303. The FFT 303 removes the sub-carriers and applies the soft modulation symbols to the intercell interference mitigation algorithm in the interference mitigation processor 207.

The output of the data pre-processing means 301 is also applied to the channel estimator 205 which comprises a serving cell channel estimator 305 and a neighbor cell channel estimator 307 which determine a channel estimate for the first OFDM transmitter 103 and the interfering OFDM transmitter 105 respectively. It will be appreciated that although FIG. 3 illustrates only a single neighbor cell channel estimator 307, a plurality of neighbor cell channel estimators would normally be supported by the channel estimator 205. The number of neighbor cell channel estimators would typically be less than or equal to the number of expected interferers X (such as the number of neighbor cells). The outputs of the channel estimators 305, 307 are channel estimates and measurements from the channel. The channel estimates are fed to the interference mitigation processor 207 and the measurement information is fed to the subcarrier status processor 203.

The subcarrier status data may in some embodiments be modulated onto the sub-carriers of the received OFDM symbol, or may e.g., be multiplexed into the OFDM transmission signal. Accordingly, the subcarrier status processor 203 can comprise a data demodulator which can derive the subcarrier status data from the received signal vector r'. In order to demodulate this signal, the demodulator of the subcarrier status processor 203 is in the example of FIG. 3 coupled to the receiver 201 from which it receives the output of the data pre-processing means 391 as well as the output vector after FFT processing. In addition, the subcarrier status processor 203 is coupled to the channel estimator 205 from which it receives the channel measurements thereby allowing it to determine the subcarrier status data. It will be appreciated that many different techniques suitable for transmitting and receiving the subcarrier status data are known and need not be described further herein. It will furthermore be appreciated that any suitable method of communicating the subcarrier status data may be used without detracting from the invention.

For example, the subcarrier status data may be communicated by explicit or implicit signalling.

As an example of explicit signalling, the OFDM transmitters 101-109 may directly include the subcarrier status data in the OFDM symbols being transmitted. For example, the transmission of the OFDM transmitters 101-109 may be divided into time intervals with each time interval beginning with the signalling OFDM symbol being transmitted. This signalling OFDM symbol can comprise the subcarrier status data for the entire time interval. E.g., within each time interval, the allocation may be constant such that a variation in the active status of the subcarriers can only occur at the time interval transitions. Thus, a single OFDM symbol, for example having a binary data value in each subcarrier indicating if the subcarrier is active or not, may be sent for the entire time interval resulting in a low signalling overhead.

In this way, the subcarrier status data may be repeatedly transmitted in each time interval of the time divided communication. In each time interval the subcarrier status data which is transmitted relates only to that time interval (or e.g., to a future time interval allowing the OFDM receivers to configure themselves according to the subcarrier status data).

The OFDM transmitters 101-109 may be synchronized such that all OFDM receivers are aware of when the signalling OFDM symbols are transmitted in different cells. It will be appreciated that in the example where the OFDM transmitters 101-109 are base stations, it may be difficult for the OFDM receiver 101 to receive data in transmissions from base stations of other cells due to the lower received signal strength and relative high interference. However, the joint data estimation of the interference mitigation processor 207 relies on assumptions of the transmitted data from other cells and inherently seeks to separate the signals from different cells. Thus, the interference from the serving cell when receiving communication from other cells can be substantially reduced and may in principle be completely eliminated if the channel estimates and the detected data are correct.

Furthermore, it will be appreciated that many techniques can be applied to improve the probability of receiving the signalling OFDM symbols from other cells. For example, as the transmission time for the OFDM signalling symbols can be known in many embodiments, the serving cell OFDM transmitter may simply cease transmission during this time interval. Indeed, neighboring cells may apply a time division scheme for transmitting the signalling OFDM symbols wherein the neighbor cells take turns transmitting the OFDM signalling symbol while the other cells cease transmission in the meantime. Thus, effectively a time domain reuse scheme may be implemented for only the OFDM signalling symbol. As the OFDM signalling symbol is only transmitted for a very short duration compared to the transmission of user data, the impact on the communication capacity may be negligible.

As another example, the OFDM transmitters 103-109 can increase the transmission power When transmitting the OFDM signalling symbols or may use a more robust constellation order for the subcarrier data symbol values (such as using BPSK symbols instead of QPSK symbols).

In some embodiments, the subcarrier status data for a given cell may not be transmitted by the base station of that cell but may alternatively or additionally be transmitted by other base stations.

For example, the base stations comprising the OFDM transmitters 103-109 are connected through a fixed network and can for example all be controlled by the same Radio Network Controller (RNC). Thus, the interfering OFDM transmitter 105 may communicate information of which subcarriers are active in the cell supported by it to the first OFDM transmitter 103 through the fixed network. The first OFDM transmitter 103 may then transmit the subcarrier status data relating to the interfering OFDM transmitter 105 directly to the OFDM receiver 101. This can provide increased communication reliability for the subcarrier status data of the interfering OFDM transmitter 105.

Indeed, in some embodiments, all the OFDM transmitters 103-109 belonging to a group may transmit the subcarrier status data for all the OFDM transmitters 103-109 of the group. In the specific example, all the base stations may transmit information of the active status of the subcarriers to their serving RNC. The RNC may then generate combined subcarrier status data by combining the received subcarrier status data from the individual base stations. The combined subcarrier status data is then fed to the base stations which subsequently transmit this over the air interface allowing the remote units to improve the intercell interference mitigation.

It will be appreciated that in some embodiments the subcarrier allocation may be performed in the RNC thereby obviating the need for this to be communicated from the base stations.

In this example, all cells connected to the same RNC transmit $\lambda_x$ for all x. Furthermore, the subcarrier status data can be transmitter by a substantially synchronous transmission of the same OFDM signaling symbol(s). This is equivalent to broadcasting the active sub-carrier groups for all cells in all cells that are connected to the same RNC. An advantage of this approach is that there is no intercell interference for the signalling symbols since the signal is common to all cells for this transmission. In fact, the simultaneous transmission may improve reliability as an air interface combination of the signals from different cells occurs. For subsequent transmissions of data the network behaves in the usual manner in terms of intercell interference.

Thus, the communication of the subcarrier status data is not limited to the cell to which the subcarrier status data relates but is also transmitted to other cells thereby facilitating intercell interference mitigation in these cells. This transmission may for example be directly from the OFDM transmitters in the other cells or may be transmitted by the OFDM transmitter of the serving cell itself.

In some embodiments, it may be advantageous to reduce the amount of subcarrier status data which is communicated by grouping subcarriers together and only providing one activity indication for each group.

Figure 4:
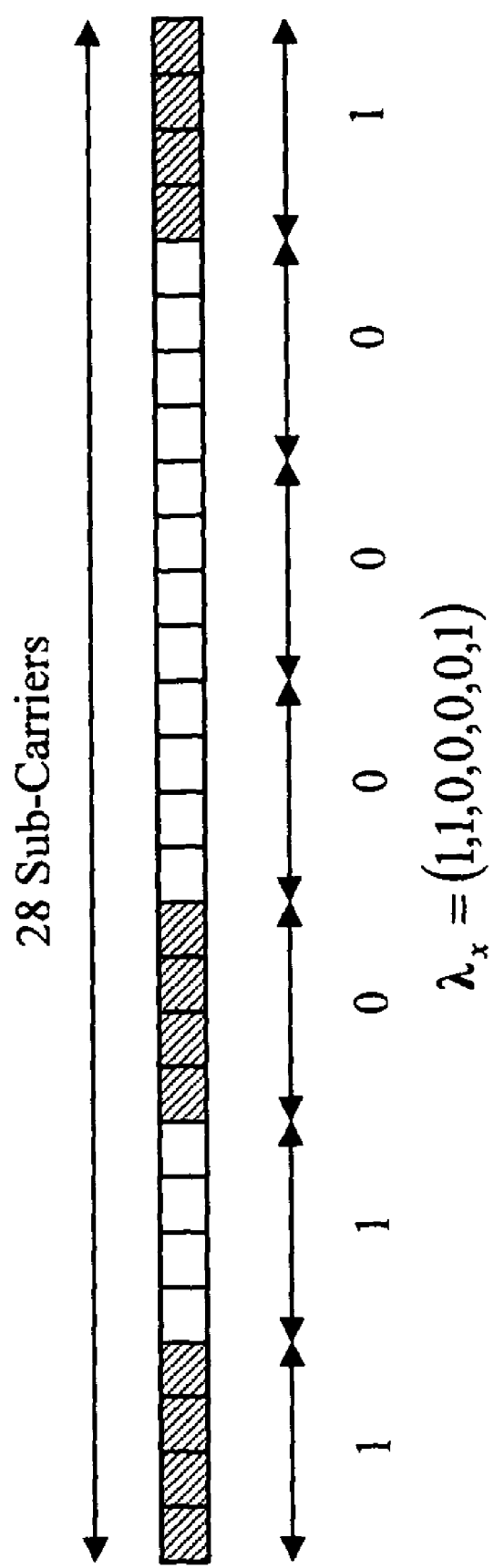
FIG. 4 illustrates an example of an allocation of groups of subcarriers of an OFDM symbol.

In OFDMA systems, a user is typically allocated a group of sub-carriers rather than a single sub-carrier. For example, subcarriers may only be allocated to individual remote units in blocks of a given size. Therefore, by only including one data symbol for each block of subcarriers a reduced size of the subcarrier status data is achieved. FIG. 4 illustrates an example of an allocation of groups of subcarriers of an OFDM symbol. In the example, a total of 28 sub-carriers are available. These are further divided into in 7 groups, with 4 sub-carriers per group. By grouping the sub-carriers together the length of $\lambda_x$ is reduced from 28 to 7 values.

In the example, an active group of sub-carriers is indicated by a pattern whereas a non-active group of sub-carriers is indicated by a clear pattern. An active sub-carrier group is signalled in the bit stream by a logical 1 and an inactive sub-carrier group by a logical 0. (It will be understood that other symbols could be used for signalling the activity of sub-carrier groups). In this example, the subcarrier status data may be represented by the bit stream of:

$$\lambda_x=(1,1,0,0,0,0,1)$$

Many OFDM communication systems use the transmission of known data sequences to facilitate reception. For example, pilot signals are often transmitted by OFDM transmitters to allow receivers to determine channel estimates with improved accuracy and less complexity. Such known data sequences may in the example of FIGS. 1 to 3 be used to determine the channel estimates.

In some embodiments, the subcarrier status data may furthermore be implicitly communicated by the known data sequences. Specifically, an OFDM transmitter may select a known data sequence from a set of known data sequences depending on the active status of the subcarriers. As a specific example corresponding to the example of FIG. 4, a set of 128 known data sequences may be allocated to the base station transmitting the signal shown in FIG. 4. The determined $\lambda_x=(1,1,0,0,0,0,1)$ may then be used to access a look-up table comprising the 128 known data sequences and the corresponding data sequence may be selected. Thus, the selected known data sequence represents the subcarrier status data.

The receiver may correlate the received input signal with all possible known data sequences and may select the sequence indicating the highest correlation. This detection may then directly be used to determine the subcarrier status data, for example by a look-up in a locally stored association between known data sequences and subcarrier status data.

As a specific example, the cellular communication system of the figures may support a number of different pilot sequences. These may be divided into a number M of pilot sequence sets, each containing a number m of pilot sequences. The pilot sequence sets can be allocated to each base station in a suitable reuse pattern. Thus, the system may effectively support cell specific pilot sequences (or sets of pilot sequences).

Figure 5:
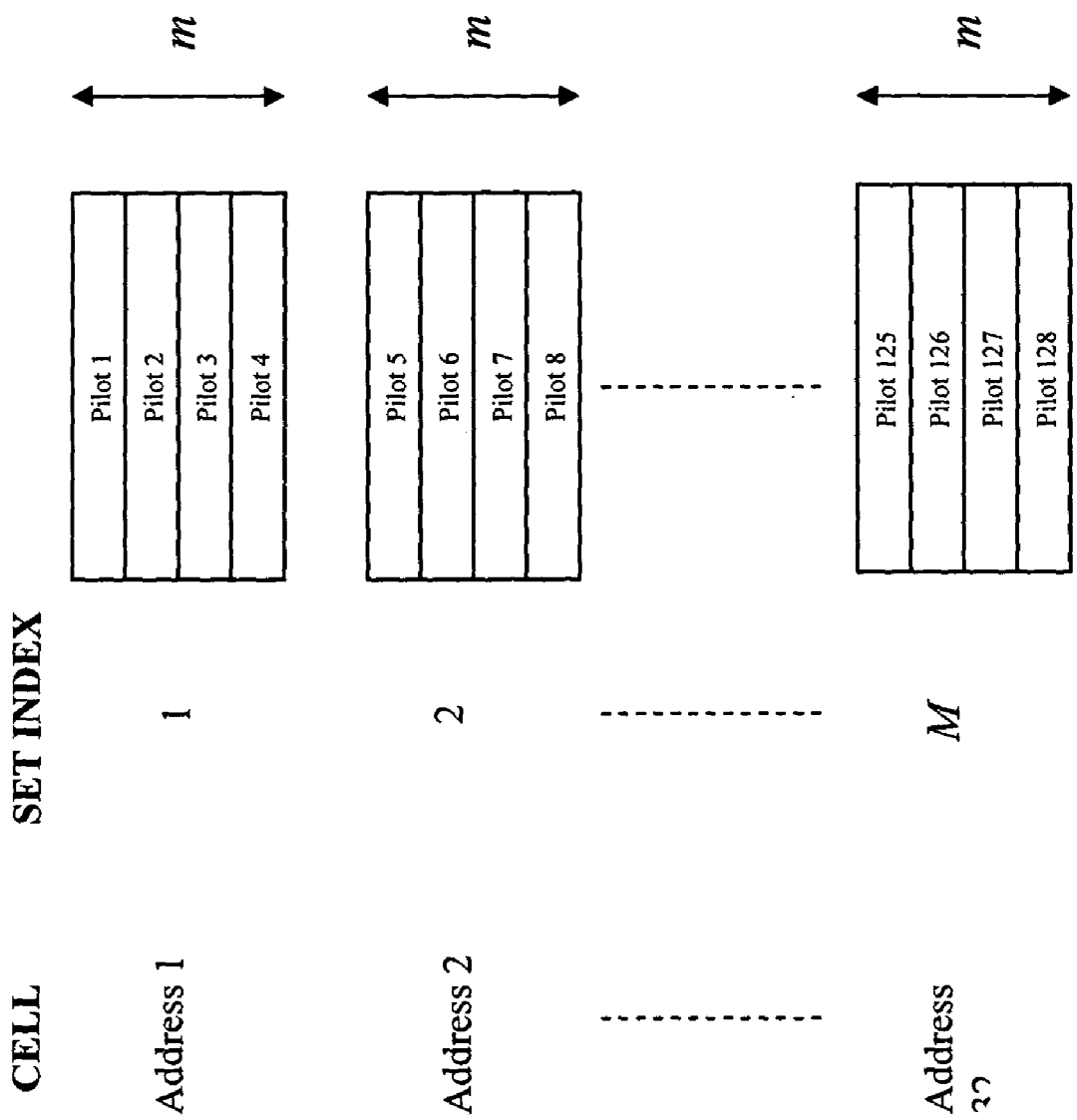
FIG. 5 illustrates an example of allocation of cell specific pilot sequences.

FIG. 5 illustrates an example of allocation of cell specific pilot sequences. In this example, 128 unique pilot sequences are segmented into 32 sets of 4 pilot sequences, so M=32 and m=4. An association is defined between a cell address and the pilot set index, this is illustrated in FIG. 5, i.e., CELL ADDRESS 2 corresponds to SET INDEX 2.

In the cellular communication system, each cell is assigned a cell address and hence at least one of the M sets of pilot sequences. Typically in a cellular communication system, the cell addresses follow a reuse pattern and hence the M sets of pilot sequences also follow a reuse pattern. Each pilot sequence within the assigned set may be assigned to an antenna for the downlink case, and for the uplink case each pilot sequence may be assigned to each user. The assigning of pilots could be flexible and the defined mappings can be known throughout the network The pilot sequences may be in the frequency domain and/or in the time domain depending on the specific embodiment.

In such a system, if an OFDM receiver is aware of the cell addresses being used in the local vicinity (for example by receiving a neighbor list containing cell addresses) then it has sufficient information to derive the pilot sequence sets being used on those cells.

The subcarrier status data may be implicitly signalled by the selection of the specific pilot sequence which has been assigned to a given subcarrier status data vector. Thus, each of the OFDM transmitters 103-109 selects the pilot sequence of the set allocated to them depending on the current subcarrier activity. As the sets are disjoint, the pilot sequences will inherently be different.

The receiver may use these different pilot sequences to determine the channel estimates for each OFDM transmitter 103-109. Specifically the OFDM receiver 101 may correlate the received signal with all possible pilot sequences. It may then proceed to evaluate each set of pilot sequences and select the highest correlation in each. This pilot sequence may then be used to determine the channel estimate for the OFDM transmitter allocated that set, and may also be used to directly indicate the subcarrier status data for that OFDM transmitter. Thus a transmission of the subcarrier status data without any additional overhead can be achieved (assuming that a sufficient number of pilot sequences are available).

In the following, a specific example of the operation of the OFDM receiver 101 will be described.

The serving base station will in most cellular communication systems transmit a neighbor list of neighbor cells. The OFDM receiver 101 may receive this neighbor list and may use this list as an indication of which cells to consider for interference mitigation, i.e., as an indication of a plurality of potentially interfering OFDM transmitters. In the example, there are X neighbor cells on the list. Each neighbor cell is given an address and this address is associated with one of the M sets of pilot sequences. The association between neighbor cell addresses and sets of pilot sequences is predefined as indicated in FIG. 5.

Accordingly, the OFDM receiver 101 is aware of the pilot sequence sets being used by the neighbor cells and using this information, the OFDM receiver 101 is able to monitor the serving cell and the neighbor cells defined on the list. The process of monitoring can consist of estimating the channel impulse response for the pilot sequences of interest (both serving cell and neighbor cells) and deriving metrics from the estimated channel impulse responses, e.g., power and intercell interference. The channel estimation may specifically comprise a correlation of the received signal with a local replica of the pilot sequence(s).

Using the determined metrics, the OFDM receiver 101 then selects the neighbor cells which are to be included in the interference mitigation. Typically a comparison of power indications may be used, such as for example a selection of the OFDM transmitters which result in the highest correlation with the corresponding pilot sequences. However, it will be appreciated that any evaluation and selection criterion may be used without detracting from the invention.

As a specific example, the interference mitigation processor 207 may be capable of simultaneously estimating data from N sources and the N−1 neighbor cells which result in the highest correlation value may be selected for the interference mitigation.

The OFDM receiver 101 may then proceed to determine the subcarrier activity vectors $\lambda_x$ for the selected subset of OFDM transmitters. As the pilot sequence for each neighbor cell has already been identified, the vector may simply be obtained by retrieving the predefined data corresponding to the pilot sequence. The channel estimates for the first OFDM transmitter 103 and the selected interfering OFDM transmitters 105-109 are then fed to the interference mitigation processor 207 together with the corresponding subcarrier status data. The interference mitigation processor 207 then proceeds to perform the interference mitigation thereby generating the data received from the first OFDM transmitter 103.

The previous description has focused on a downlink application in a cellular communication system. However, it will be appreciated that the described concepts are equally applicable to an uplink scenario. Thus, the concepts are equally applicable to a scenario wherein the OFDM receiver 101 is a base station and the OFDM transmitters 103-109 of FIG. 1 are remote units of a cellular communication system. In this example, at least the first OFDM transmitter and the interfering OFDM transmitter 105 have different serving cells.

In such an embodiment, the OFDM receiver 101 may generate subcarrier status data for a neighbor cell by combining subcarrier status data received from different sources. For example, the OFDM transmitters 105-109 may all be in the same neighbor cell of the first OFDM transmitter 103. Each of the OFDM transmitters 105-109 may transmit subcarrier status data relating to the subcarrier status of their respective transmissions. For example, each of the OFDM transmitters 105-109 may transmit a binary data word corresponding to the OFDM symbols with a binary data value of 1 if the corresponding subcarrier is active for that OFDM transmitter and a binary data value of 0 if the corresponding subcarrier is not active.

The OFDM receiver 101 may thus receive the data words from the different OFDM transmitters 105-109 and may perform a digital OR function to determine a subcarrier status data vector indicative of which subcarriers are active in the neighbor cell.

Furthermore, the received subcarrier status data from the different OFDM transmitters 105-109 may be used to determine which channel estimates are used for the individual subcarriers.

Thus, for the subcarriers that the OFDM transmitter 105 has indicated are active, the channel estimate for that OFDM transmitter 105 is used. Similarly, for the subcarriers which the OFDM transmitter 107 has indicated are active, the channel estimate for that OFDM transmitter 107 is used etc. Thus, the appropriate channel estimates for the individual subcarriers may be provided to the interference mitigation processor 207 thereby resulting in improved interference mitigation and an efficient and low complexity system.

In the example, the identity of an interfering OFDM transmitter may be determined for the individual subcarrier (or group of subcarriers) in response to the received subcarrier status data.

Figure 6:
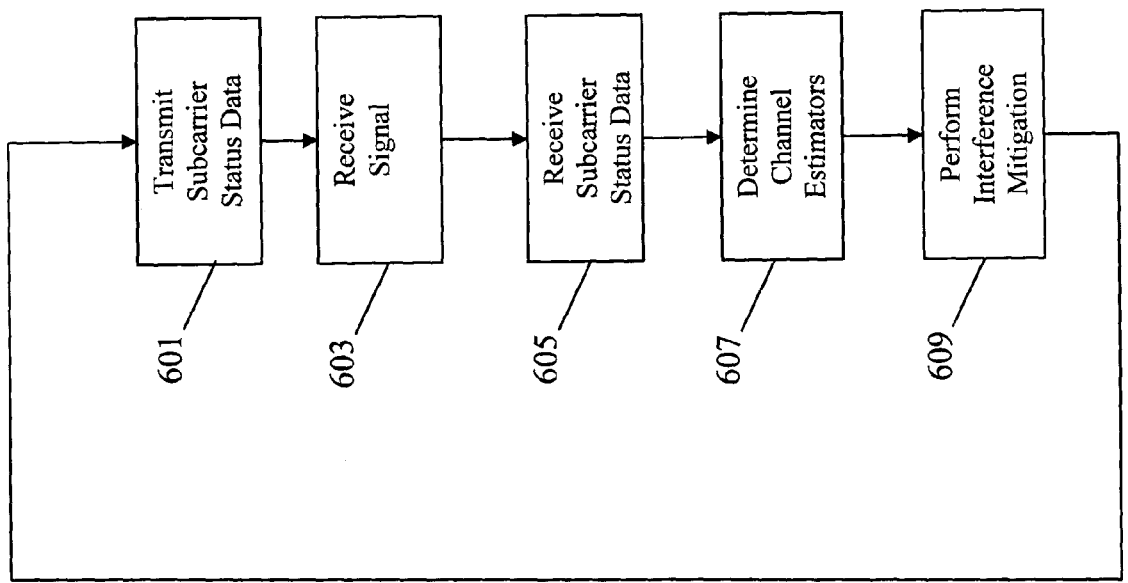
FIG. 6 illustrates an example of a method of interference mitigation in an Orthogonal Frequency Division Multiplex (OFDM) communication system in accordance with some embodiments of the invention.

FIG. 6 illustrates an example of a method of interference mitigation in an Orthogonal Frequency Division Multiplex (OFDM) communication system in accordance with some embodiments of the invention. The method is applicable to the system of FIG. 1 where the OFDM receiver 101 is receiving data from the first OFDM transmitter 103 and will be described with reference to this example.

The method initiates in step 601 wherein subcarrier status data is transmitted to the OFDM receiver 101. The subcarrier status data may for example be transmitted from the OFDM transmitters 103-109. The subcarrier status data is indicative of active subcarriers for one or more of the OFDM transmitters 105-109.

Step 601 is followed by step 603 wherein the receiver 201 receives a signal comprising a desired signal component from the first OFDM transmitter 103 and interference from at least one interfering OFDM transmitter 105.

Step 603 is followed by step 605 wherein the receiver 201 and the subcarrier status processor 203 receive the subcarrier status data.

Step 605 is followed by step 607 wherein the channel estimator 205 determines channel estimates for at least an air interface communication channel from the first OFDM transmitter 103 and an air interface communication channel from the interfering OFDM transmitter 105.

Step 607 is followed by step 609 wherein the interference mitigation processor 207 performs mitigation of the interference in response to the subcarrier status data and the channel estimates thereby generating the data transmitted from the first OFDM transmitter 103.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention: In the claims, the term comprising does not exclude the presence of other elements or steps.

Furthermore, although individually listed, a plurality of means, elements or method steps may be implemented by e.g., a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an first", "second", etc. do not preclude a plurality.

The invention claimed is:

1. An Orthogonal Frequency Division Multiplex (OFDM) communication system comprising:
    a plurality of OFDM transmitters;
    at least one OFDM receiver for receiving an OFDM signal from a first OFDM transmitter of the plurality of OFDM transmitters; and
    at least one transmitter for transmitting a subcarrier status data to the OFDM receiver, wherein the subcarrier status data is indicative of active subcarriers for a number of OFDM transmitters other than the first OFDM transmitter;
wherein the OFDM receiver comprises:
    a receiver for receiving a signal comprising a desired signal component from the first OFDM transmitter and interference from at least one interfering OFDM transmitter of the plurality of OFDM transmitters,
    and for receiving the subcarrier status data,
    channel estimator for determining channel estimates for at least an air interface communication channel from the first OFDM transmitter and an air interface communication channel from the at least one interfering OFDM transmitter,
    a processor performing mitigation of the interference using the subcarrier status data for the number of OFDM transmitters other than the first OFDM transmitter and the channel estimates for the at least one interfering OFDM transmitter.

2. The OFDM communication system of claim 1 wherein the at least one interfering OFDM transmitter is configured to transmit subcarrier status data indicative of active subcarriers of the at least one interfering OFDM transmitter.

3. The OFDM communication system of claim 1 wherein at least one other OFDM transmitter of the plurality of OFDM transmitters is configured to transmit subcarrier status data indicative of active subcarriers of the at least one interfering OFDM transmitter.

4. The OFDM communication system of claim 1 wherein all OFDM transmitters of a group of OFDM transmitters transmit subcarrier status data for all the OFDM transmitters of the group.

5. The OFDM communication system of claim 4 wherein the group of OFDM transmitters corresponds to base stations controlled by a single Radio Network Controller of a cellular communication system.

6. The OFDM communication system of claim 4 wherein the group of OFDM transmitters are configured to transmit at least some of the subcarrier status data by a substantially synchronous transmission of the same OFDM symbol.

7. The OFDM communication system of claim 1 wherein the at least one transmitter is configured to repeatedly transmit subcarrier status data, each transmission of subcarrier status data relating to a time interval in which the subcarrier status data is valid.

8. The OFDM communication system of claim 1 wherein the at least one interfering OFDM transmitter is configured to transmit a known data sequence.

9. The OFDM communication system of claim 8 wherein the channel estimator is configured to determine the channel estimate for the at least one interfering OFDM transmitter in response to the known data sequence.

10. The OFDM communication system of claim 8 wherein the at least one transmitter is arranged in the at least one interfering OFDM transmitter to select the known data sequence in response to the active subcarriers for the at least one interfering OFDM transmitter.

11. The OFDM communication system of claim 1 wherein the OFDM receiver is configured to determine the subcarrier status data in response to a detection of a known data sequence of an OFDM transmission.

12. The OFDM communication system of claim 1 wherein disjoint sets of known data sequences are allocated to different OFDM transmitters.

13. The OFDM communication system of claim 1 wherein the subcarrier status data comprises at least one data value indicative of an active subcarrier status for a group of subcarriers.

14. The OFDM communication system of claim 1 further comprising a transmitter for transmitting an indication of a plurality of potentially interfering OFDM transmitters to the OFDM receiver.

15. The OFDM communication system of claim 1 wherein the OFDM receiver further comprises a processor for evaluating received signals from a plurality of potentially interfering transmitters, and for selecting a subset of the plurality of potentially interfering transmitters for interference mitigation in response to the evaluation.

16. The OFDM communication system of claim 15 wherein the processor selects a subset of the subcarrier status data relating to the subset of the plurality of potentially interfering transmitters.

17. The OFDM communication system of claim 1 wherein the OFDM receiver is arranged to determine an identity of an OFDM transmitter active on a given subcarrier in response to the subcarrier status data.

18. The OFDM communication system of claim 1 wherein the OFDM receiver is arranged to determine channel estimates for individual subcarriers in response to the subcarrier status data.

19. The OFDM communication system of claim 1 wherein the receiver is configured to receive a subset of the subcarrier status data from a plurality of OFDM transmitters; and the OFDM receiver is arranged to determine subcarrier status data by combining the subsets of subcarrier status data.

20. The OFDM communication system of claim 1 wherein the processor is configured to perform a joint determination of data symbols from at least the first OFDM transmitter and the interfering OFDM transmitter.

21. The OFDM communication system of claim 1 wherein the communication system is a cellular communication system.

22. The OFDM communication system of claim 21 wherein the plurality of OFDM transmitters correspond to a plurality of base stations.

23. The OFDM communication system of claim 21 wherein the OFDM receiver is arranged to determine subcarrier status data for a neighbor cell of a serving cell of the OFDM receiver.

24. The OFDM communication system of claim 21 wherein the processor is configured to determine a subcarrier activity status for a neighbor cell of a serving cell of the OFDM receiver from subsets of subcarrier status data received from a plurality of OFDM transmitters of the neighbor cell.

25. The OFDM communication system of claim 21 wherein the plurality of OFDM transmitters correspond to a plurality of remote units wherein the first OFDM transmitter and the interfering OFDM transmitter have different serving cells.

26. An OFDM receiver for receiving an OFDM signal from a first OFDM transmitter of a plurality of OFDM transmitters, the OFDM receiver comprising:
   a receiver for receiving a signal comprising a desired signal component from the first OFDM transmitter and interference from at least one interfering OFDM transmitter of the plurality of OFDM transmitters;
   and for receiving subcarrier status data from a transmitter, wherein the subcarrier status data is indicative of active subcarriers for a number of OFDM transmitters other than the first OFDM transmitter;
   channel estimator for determining channel estimates for at least an air interface communication channel from the first OFDM transmitter and an air interface communication channel from the at least one interfering OFDM transmitter;
   processor for performing mitigation of the interference using the subcarrier status data for the number of OFDM transmitters other than the first OFDM transmitter and the channel estimates for the at least one interfering OFDM transmitter.

27. The OFDM receiver of claim 26 wherein the channel estimator is configured to determine the channel estimate for the at least one interfering OFDM transmitter in response to a known data sequence.

28. The OFDM receiver of claim 26 wherein the OFDM receiver is arranged to determine the subcarrier status data in response to a detection of a known data sequence of an OFDM transmission.

29. The OFDM receiver of claim 26 wherein the OFDM receiver is arranged to evaluate received signals from a plurality of potentially interfering transmitters, and select a subset of the plurality of potentially interfering transmitters for interference mitigation in response to the evaluation.

30. The OFDM receiver of claim 29 further arranged to select a subset of the subcarrier status data relating to the subset of the plurality of potentially interfering transmitters.

31. The OFDM receiver of claim 26 wherein the OFDM receiver is arranged to determine an identity of an OFDM transmitter active on a given subcarrier in response to the subcarrier status data.

32. The OFDM receiver of claim 26 wherein the OFDM receiver is arranged to determine channel estimates for individual subcarriers in response to the subcarrier status data.

33. The OFDM receiver of claim 26 arranged to receive a subset of the subcarrier status data from a plurality of OFDM transmitters; and the OFDM receiver is arranged to determine subcarrier status data by combining the subsets of subcarrier status data.

34. The OFDM receiver of claim 26 wherein the processor is arranged to perform a joint determination of data symbols from at least the first OFDM transmitter and the interfering OFDM transmitter.

35. The OFDM receiver of claim 26 wherein the OFDM receiver is arranged to determine subcarrier status data for a neighbor cell of a serving cell of the OFDM receiver.

36. A method of interference mitigation in a Orthogonal Frequency Division Multiplex (OFDM) communication system comprising a plurality of OFDM transmitters, and at least one OFDM receiver for receiving an OFDM signal from a first OFDM transmitter of the plurality of OFDM transmitters, the method comprising:
transmitting subcarrier status data to the at least one OFDM receiver, wherein the subcarrier status data is indicative of active subcarriers for a number of OFDM transmitters other than the first OFDM transmitter;
and at the OFDM receiver:
receiving a signal comprising a desired signal component from the first OFDM transmitter and interference from at least one interfering OFDM transmitter of the plurality of OFDM transmitters,
receiving the subcarrier status data,
determining channel estimates for at least an air interface communication channel from the first OFDM transmitter and an air interface communication channel from the at least one interfering OFDM transmitter,
performing mitigation of the interference using the subcarrier status data for the number of OFDM transmitters other than the first OFDM transmitter and the channel estimates for the at least one interfering OFDM transmitter.

37. The method of claim 36 comprising the at least one interfering OFDM transmitter transmitting subcarrier status data indicative of active subcarriers of the at least one interfering OFDM transmitter.

38. The method of claim 36 wherein at least one other OFDM transmitter of the plurality of OFDM transmitters transmits subcarrier status data indicative of active subcarriers of the at least one interfering OFDM transmitter.

39. The method of claim 38 wherein the OFDM receiver determines the subcarrier status data in response to a detection of a known data sequence of an OFDM transmission.

40. The method of claim 36 wherein all OFDM transmitters of a group of OFDM transmitters transmit subcarrier status data for all the OFDM transmitters of the group.

41. The method of claim 36 wherein the at least one interfering OFDM transmitter transmits a known data sequence.

42. The method of claim 41 wherein the channel estimate for the interfering OFDM transmitter is determined in response to the known data sequence.

43. The method of claim 41 wherein the at least one interfering OFDM transmitter selects the known data sequence in response to the active subcarriers for the at least one interfering OFDM transmitter.

44. The method of claim 36 wherein the subcarrier status data comprises at least one data value indicative of an active subcarrier status for a group of subcarriers.

45. The method of claim 36 comprising transmitting an indication of a plurality of potentially interfering OFDM transmitters to the OFDM receiver.

46. The method of claim 36 wherein, at the OFDM receiver, wherein the method further comprises evaluating received signals from a plurality of potentially interfering transmitters, and selecting a subset of the plurality of potentially interfering transmitters for interference mitigation in response to the evaluation.

47. The method of claim 46 comprising selecting a subset of the subcarrier status data relating to the subset of the plurality of potentially interfering transmitters.

48. The method of claim 36 comprising the OFDM receiver further determining an identity of an OFDM transmitter active on a given subcarrier in response to the subcarrier status data.

49. The method of claim 36 comprising the OFDM receiver determining channel estimates for individual subcarriers in response to the subcarrier status data.

* * * * *